US005871312A

United States Patent [19]

Haninger et al.

[11] Patent Number: 5,871,312

[45] Date of Patent: Feb. 16, 1999

[54] MACHINE TOOL HAVING A SLIDING DOOR

[75] Inventors: Rudolf Haninger, Seitingen; Hans-Henning Winkler, Tuttlingen, both of Germany

[73] Assignee: Chiron-Werke GmbH & Co. KG, Tuttlingen, Germany

[21] Appl. No.: 839,123

[22] Filed: Apr. 23, 1997

[30] Foreign Application Priority Data

Apr. 25, 1996 [DE] Germany ........................ 196 16 483.4

[51] Int. Cl.[6] ........................ B23C 9/00

[52] U.S. Cl. ........................ 409/134; 144/285; 160/231.2

[58] Field of Search ........................ 160/196.1, 201, 160/231.1, 231.2, 187, 194; 409/134; 144/285; 206/816; 74/608, 609, 612

[56] References Cited

U.S. PATENT DOCUMENTS

| | | | |
|---|---|---|---|
| 227,858 | 5/1880 | Talbott | 74/208 |
| 2,689,003 | 9/1954 | Helbert et al. | 160/196.1 |
| 3,293,941 | 12/1966 | Schwabe, Jr. | 409/134 |
| 3,297,077 | 1/1967 | Garbus | 160/231.2 |
| 3,441,975 | 5/1969 | Shepherd | 160/231.2 |
| 3,848,721 | 11/1974 | Smit | 192/133 |
| 4,162,024 | 7/1979 | Shanley | 220/350 |
| 4,404,770 | 9/1983 | Markus | 49/235 |
| 4,425,739 | 1/1984 | Garbell | 49/424 |
| 4,762,020 | 8/1988 | Schmidberger et al. | 74/612 |
| 4,802,392 | 2/1989 | Striebig | 83/100 |
| 4,987,638 | 1/1991 | Ribaudo | 160/196.1 |
| 4,999,895 | 3/1991 | Hirose et al. | 409/134 |
| 5,178,499 | 1/1993 | Umeda et al. | 409/134 |
| 5,342,156 | 8/1994 | Baba | 409/134 |
| 5,439,431 | 8/1995 | Hessbruggen et al. | 483/14 |
| 5,450,693 | 9/1995 | Tarrega | 49/411 |
| 5,482,414 | 1/1996 | Hayashi et al. | 409/134 |

FOREIGN PATENT DOCUMENTS

| | | | |
|---|---|---|---|
| 0 041 164 | 12/1981 | European Pat. Off. . | |
| 2291340 | 6/1976 | France | 160/231.2 |
| 26 53 587 | 1/1978 | Germany . | |
| 30 20 621 A1 | 12/1981 | Germany . | |
| 35 13 944 C2 | 8/1987 | Germany . | |
| 42 14 928 A1 | 11/1993 | Germany . | |
| 295 00 395.2 | 4/1995 | Germany . | |

*Primary Examiner*—Andrea L. Pitts
*Assistant Examiner*—Christopher Kirkman
*Attorney, Agent, or Firm*—Cummings & Lockwood

[57] ABSTRACT

A machine tool comprises a working space in which workpieces are to be machined and which is closed off against the outside by a case. The case comprises an opening, that can be closed by at least one sliding door and that gives access to the working space. The sliding door comprises vertically arranged slat elements that are connected one with the other by hinge connections.

19 Claims, 4 Drawing Sheets

10 20 II 17 11 18 13 14 VI VI 12 19 II 16

68
74
73
72
71
77
11
75
66
67
21c
13
23b
12
22
78
78
21b
19
23a
64
63
20
61
62
21a
81

MACHINE TOOL HAVING A SLIDING DOOR

BACKGROUND OF THE INVENTION

1. Field of the Invention

The present invention relates to a machine tool having a working space in which workpieces are to be machined and which is closed off against the outside by a case in which an opening, that can be closed by at least one sliding door, is provided to give access to the working space.

2. Related Prior Art

Machine tools of this kind are known from the prior art.

The working space of such machine tools serves for machining workpieces that are, as a rule, mounted in a receptacle on a worktable. The machine tools comprise a spindle in which a tool can be selectively fitted for machining the workpieces.

The working space is closed off from the outside by a case in order to protect the environment and the operators from chips flying around in the working space and from splashing diluted soluble oil and coolant during machining of the workpieces. The case has an opening through which setting-up operations can be carried out and workpieces can be exchanged. This opening is normally closed by a door which is opened by an operator who wishes to carry out setting-up or tool-changing operations.

An operator door of that kind must meet quite a number of requirements; to begin with, opening of such a door must be possible very quickly and in a simple way. In addition, it must be ensured that the door mechanism cannot be soiled by chips flying around and splashing diluted soluble oil and coolant to such an extent that the door will get jammed and finally be blocked altogether.

Another requirement that must be met by such operator doors is that they must close off the opening very reliably so that the door area does not present a weak point in the case.

Another requirement to be met by such machine tools is that the opening must be very large to permit setting-up work and tool changes to be effected with the greatest possible ease. For, the smaller the operator door and, thus, the resulting opening, the greater the difficulties for the operator in carrying out the necessary operations inside the working space.

Another requirement, which is in opposition to the last-mentioned requirement, is that the outer dimensions of the machine tools should be as small as possible, and that the space requirements for the operator in front of the machine should also be as small as possible. This is to be seen against the background that machine tools of that kind are often part of numerically controlled machining centers where a great number of machine tools have to be arranged one beside the other and one opposite to the other, on the least possible floor space.

The operator doors known in the art are, for example, folding and hinged doors that are opened by folding or swinging them toward the top or the side. On the other hand, there have also been known sliding doors of the before-mentioned kind, which require that a corresponding space be available beside the sliding door for receiving the door elements when they are slid to the side. In the case of such sliding doors, the space available as operator opening is often less than half the total width of the machine tool. As frequently additional operating elements, etc., are to be arranged at the front of the machine tool, the remaining width of the operator opening is often as small as ⅓ of the overall width of the machine tool.

Especially in cases where telescoping, multi-layer doors or sliding doors are used, it is of disadvantage that on the one hand important mechanical input is required, while on the other hand the protection of the door mechanism from the working space is frequently so inefficient that the door mechanism may get soiled and, thus, jammed.

It is, therefore, a disadvantage of the known machine tools and the known operator doors that on the one hand the machine tools present a great width and/or the opening to be closed by the operator door is relatively narrow and in many cases has a limited height. Such machine tools are, consequently, not operator-friendly.

The before-mentioned hinged doors provide the disadvantage that their design is often very complex and that in addition such hinged doors swing into the working space where they create a risk of collision with the spindle.

If, in contrast, hinged doors are swung open to the outside, then much space is required in front of the machine tool, which is likewise regarded as a disadvantage.

Generally, it is another disadvantage of known operator doors that they frequently do not provide efficient sealing of the working space and that because of their mechanically very complex design they cannot be operated quickly and easily.

SUMMARY OF THE INVENTION

In view of the above, it is an object of the present invention to improve the machine tool mentioned at the outset in such a way that a structurally simple and low-cost design is obtained, while at the same time the greatest possible opening is provided, related to the width of the machine tool, and that the sliding door provides efficient sealing of the opening and is easy and simple to operate.

This object is achieved, with the machine tool mentioned at the outset, by the fact that the sliding door comprises vertically arranged slat elements that are connected one with the other by hinge connections.

The object underlying the invention is completely achieved in this fashion. The sliding door now consists of elements that are connected one with the other by hinge connections and that can be "slid around the corner" or be wound up so that one does no longer need considerable space for receiving the displaced door elements beside the opening that is to be closed by the sliding door. Thus, a great part of the width of the novel machine tool is available for the opening.

An important aspect of the present invention, among others, is the hinge connection between neighboring slat or lamella elements, which, as has been found by the inventor, can be very efficiently sealed one from the other by such hinge connections, while still allowing space-saving accommodation of the door in its open condition.

Another advantage of this design lies in the fact that no complex structures must be accommodated above and below the sliding door so that on the one hand the before-mentioned collision risk has been removed and on the other hand the opening can now have a considerable height, given the small space requirements above and below the sliding door.

Thus, quite generally the novel machine tool can be provided with a very big opening to give access to the working space.

According to a further improvement it is then preferred if a connection element is provided between two neighboring slat elements, which has substantially the same height as the slat elements and which comprises two outer engaging elements as connection with the two slat elements, as well as a flexible web or link arranged between the engaging elements.

It is an advantage here that such a connection element permits very efficient sealing between neighboring slat elements, while providing at the same time the hinged connection. This feature is, therefore, an advantage also under constructional aspects.

According to a further embodiment it is then preferred if the connection element is made as a single piece from a plastic material and is flexible in the area of the web.

This provides the advantage that no gaps exist in the connection elements as such so that the slats need not overlap each other to ensure efficient sealing of the working space.

On the other hand it is preferred if the connection element is made as a single piece from a plastic material and is given a predetermined buckling point in the area of the web.

It is of advantage here that the web can also be given a certain strength so that any damage to the connection element by chips flying around does not present a great danger. Thus, this feature is likewise of advantage under constructional aspects.

It is preferred in this case if the predetermined buckling point is an area of reduced thickness, compared with the remaining web.

This provides the advantage that the predetermined buckling point is obtained by simply reducing the thickness of the material in this area, which is measure that can be carried out at low cost and in a simple way.

It is a further advantage in this connection if the engaging elements are designed as beads and the slat elements are provided with channels intended to receive the beads, the channels comprising a lateral slot through which the web projects to the outside.

This feature is also advantageous under constructional aspects, as the connection between the slat elements and the connection elements can be effected in this case very simply by introducing the beads into the channels. In addition, the structure of the connection elements, which therefore have the cross-sectional shape of a dumbbell, is extremely simple so that they altogether form very low-cost elements.

It is generally preferred if the sliding door is suspended on an upper runner rail via rollers, the sliding door being preferably held on a lower guide rail.

It is of advantage in this case that for operating the sliding door only little force is required, while at the same time the lower guide rails provide very efficient sealing of the working space also to the bottom without any expensive constructional steps being required.

It is further preferred if a cover is provided as a protection above the runner rail.

This provides the advantage that no dirt can get on the runner rail and/or the rollers so that the sliding door cannot get jammed.

It is further preferred if at least some of the slat elements are provided with an upper suspension element with a roller mounted on its side facing away from the working space and, preferably, a roof section of the suspension element projecting over the roller.

This feature provides even better protection of the rollers from dirt, which means that it is generally ensured in this case that, advantageously, the sliding door will move easily, even after extended operation of the novel machine tool.

It is further preferred it at least some of the slat elements are provided with a lower guide element with a guide channel provided on its face opposite the working space, for being engaged by the guide rail.

Again, it is of advantage in this case that the lower guide of the sliding door is protected from soiling so that the sliding door as a whole will retain its easy-moving properties. As in the case of the suspension elements, it is an advantage of the guide element that the engaging elements, i.e. the roller and/or the guide channel, are respectively arranged on the side opposite the working space where the risk of soiling is clearly lower than on the opposite side.

Generally, it is preferred if the runner rail comprises an upwardly open profile rail of U-shaped cross-section, the inner leg of which is engaged by the rollers, while preferably the guide rail comprises a downwardly open profile rail with U-shaped cross-section, the inner leg of which is engaged by the guide channel.

This feature offers constructional advantages and, in addition, advantages in connection with the assembly, i.e. the installation of the sliding door on the novel machine tool. The sliding door is first fitted in the guide rail by its bottom so that the guide channel comes to engage around the inner leg of the lower profile rail. Thereafter, the sliding door is lifted until the rollers can be fitted on the inner leg of the upper profile rail. The sliding door is now suspended at its top on the runner rail, via the rollers, and is guided at its bottom on the guide rail, via the guide channel.

It is preferred in this connection if the guide channel comprises a first arc-shaped side wall, viewed from above, and a second side wall provided with a recess in its central area.

It is an advantage of this feature that the guide channel is capable of safely holding the respective slat element both in straight and bent sections of the inner leg of the lower profile rail. This feature also has constructional advantages because the objectives of mechanically reliable guiding and an arrangement protected from soiling can be achieved at the same time without greater input.

It is generally preferred if the sliding door is wider than the opening by at least the width of one slat element.

It is an advantage of this feature that simple sealing of the edges is achieved by an overlapping arrangement because the slats extend on both sides of the opening beyond the latter.

It is further preferred in this connection if the first and the last slat elements are each provided with a stop element which, in the closed condition of the sliding door, is in engagement with a plate that projects from the case.

One thus obtains, in a simple way, a stop limiting the sliding movement of the sliding door and, on the other hand, safe sealing of the edges.

It is further preferred in this connection if in the closed condition of the sliding door the first slat element, in the direction of the closing movement of the sliding door, is seated at least in part in a laterally open channel which extends substantially over the full height of the slat element and is sealed from the working space by an angled sheet fastened on the first slat element.

This feature is of advantage insofar as a labyrinth-like dirt trap is produced which ensures very efficient sealing of the working space without any need for complicated constructional measures.

It is generally preferred if the sliding door is arranged in the working space.

This provides the advantage, on the one hand, that sealing of the opening in the case is rendered easier because it is now only necessary to make the dimensions of the sliding door larger than the opening as such. Another advantage is seen in the fact that no additional space is required outside the machine tool for accommodating the sliding door in its open condition.

It is generally preferred in this connection if the sliding door is guided in the working space in curved guide elements, preferably arranged on the case, that extend at least in part along one side wall of the case.

It is an advantage of this arrangement that the slat elements of the sliding doors need not be rolled up when the door is opened, but can be sort of moved around the corner so that in its open condition the sliding door extends largely inside the machine tool, but along one side wall. Thus, one only has to provide sufficient space beside the opening in the case, that has to be closed by the sliding door, to allow the slat elements to be turned around from the front to the side wall. It is a further advantage in this connection that in spite of offering a very wide access opening to the working space, the novel machine tool only has a small overall width.

It is preferred in this connection if between the suspension element and the slat element held by it a seal is provided that seals the slat element off against the top.

It is an advantage of this arrangement that hollow, i.e. very light-weight slat elements may be used that need not necessarily be closed liquid-tight on their tops. The necessary protection is achieved by the seal which prevents coolant from penetrating into the slat element and from filling the latter during operation so that eventually the admissible weight of the slat element may be exceeded. The inventors of the present invention have found that such a sealing arrangement makes it possible to use very simple and low-cost slat elements which will not gradually fill with coolant, i.e. which will retain their low weight so that the operator door will remain easy and simple to open and/or to close even after extended operation of the novel machine tool.

Further advantages will become apparent from the specification and the attached drawing.

It should be noted that the before-mentioned features and those to be explained below can be used not only in the respective combinations indicated, but also in other combinations or in isolation, without leaving the context of the present invention.

BRIEF DESCRIPTION OF THE DRAWINGS

An embodiment of the invention is depicted in the appended drawings and will be explained in more detail in the description below. In the drawings.

DETAILED DESCRIPTION OF THE PREFERRED EMBODIMENTS

Figure 1:
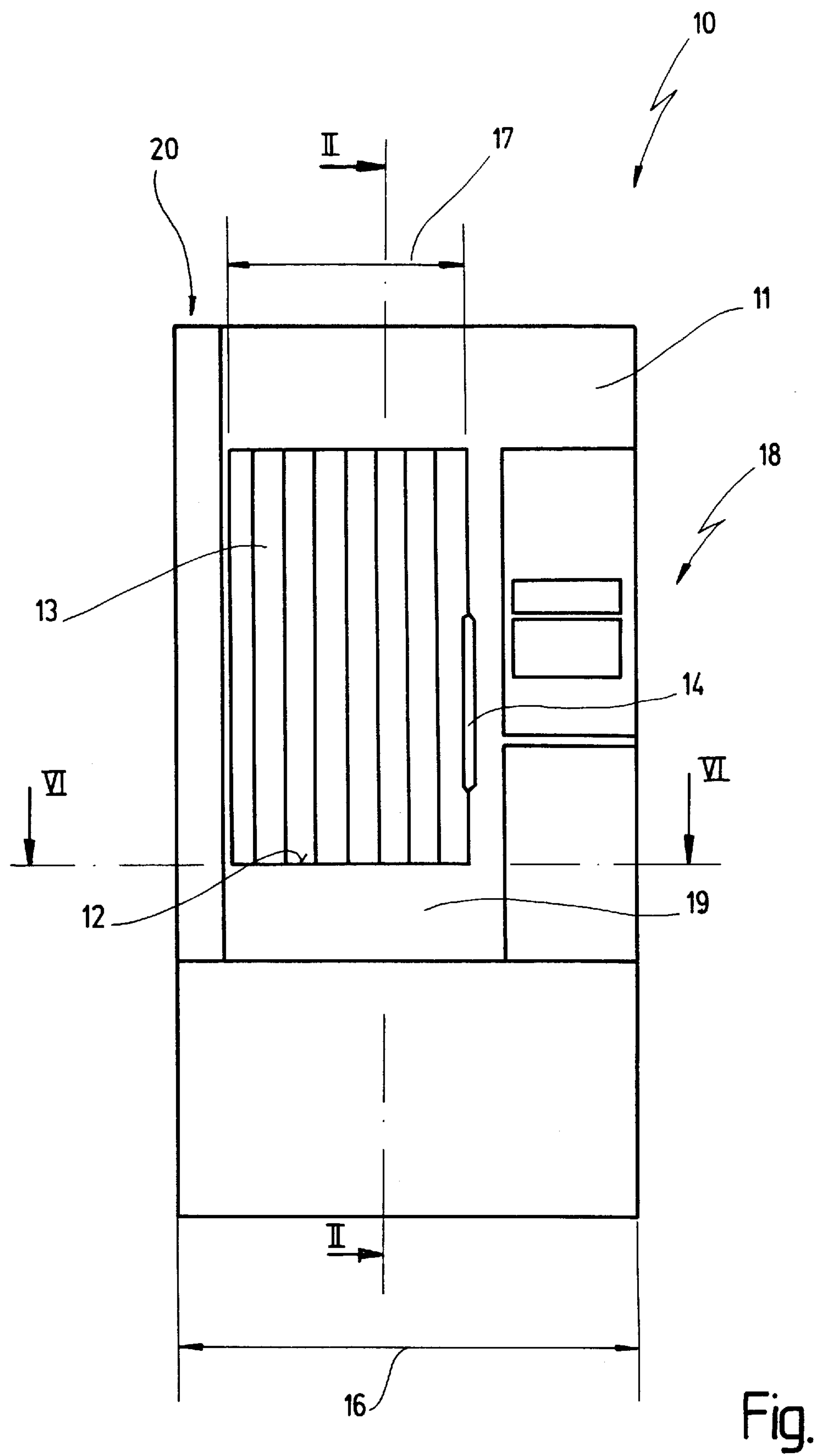
FIG. 1 shows a schematic front view of the novel machine tool.

In FIG. 1 a machine tool, which is depicted in this Figure only schematically, is indicated generally by reference numeral 10. The machine tool 10 comprises a case 11 with an opening 12 which provides access to the inner space of the machine tool 10.

The opening 12 is closed by a sliding door 13 that can be pushed to the left—in FIG. 1—by means of a handle 14 indicated only schematically. The novel machine tool 10 may of course also be provided with two sliding doors, which are then opened from the middle of the opening 12 toward the two sides.

The machine tool 10 has a width indicated at 16, while the opening 12 has a width indicated at 17. The width 17 of the opening 12 extends over more than half of the width 16 of the machine tool 10, and the opening 12 also has a considerable height. All in all, the opening 12 therefore has a size that provides very easy access to the working space of the machine tool 10.

Beside the opening 12, schematically indicated operating elements 18 can be seen, which are likewise arranged in a front 19 of the machine tool 10.

At the left beside the opening 12, there can be seen a small free space 20 which is intended to receive, in a manner to be described further below, the sliding door 13 in its open condition, the latter comprising vertically arranged slat elements 21 that are connected one with the other in hinged fashion.

Figure 2:
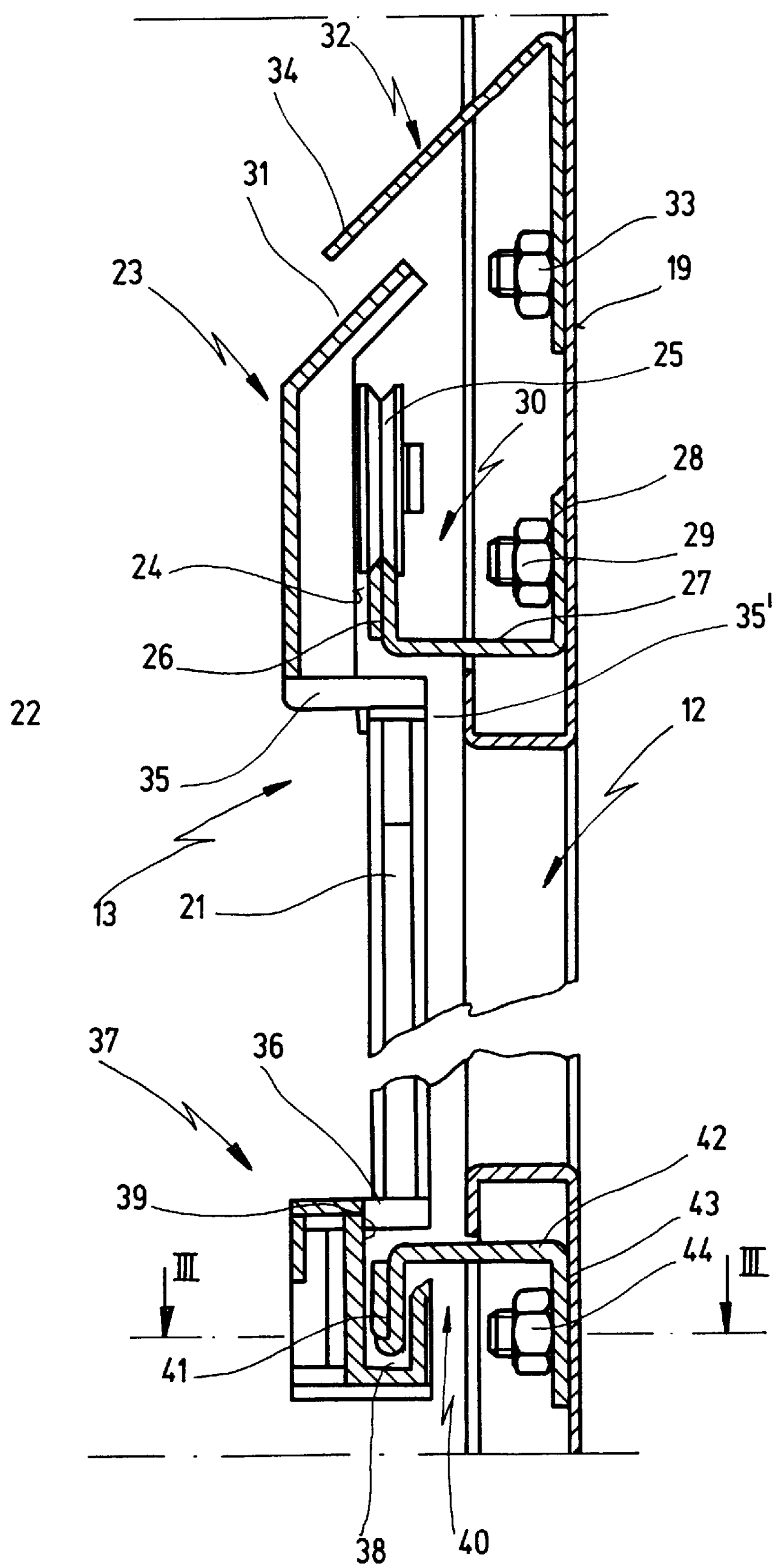
FIG. 2 shows a section through the case of the machine tool according to FIG. 1, in the area of its opening, taken along line II—II in FIG. 1.

FIG. 2 shows a section, taken along line II—II in FIG. 1, through the case 11 in the area of the opening 12. FIG. 2 shows the opening 12 in the case 11, through which access is provided to the working space 22 of the novel machine tool 10. In the illustrated position of the sliding door 13, however, the opening 12 is closed by the door.

The slat element 21 indicated schematically in FIG. 2 is provided on its upper end with a suspension element 23, which is equipped with a rotatable track roller 25 on its side 24 facing away from the working space 22. The track roller 25 rides on an inner leg 26 of an upwardly open, U-shaped profile rail 27 which has its second leg 28 screwed to the front of the case 11 by means of a screw nut 29. The screw nut 29 is screwed onto a welded-on bolt.

The profile rail 27 forms an upper runner rail 30 on which the whole sliding door 13 is suspended via track rollers 25.

As a protection for the track roller 25, the suspension element 23 is further provided with a roof section 31, extending obliquely to the right top in FIG. 2, so that chips and diluted soluble oil and coolant cannot get onto the track roller 25.

Above the suspension element 23, there is provided a further cover 32 that is mounted on the case 11 by means of a screw 33. The cover 32 comprises an inclined face 34, that extends beyond the roof section 31 so that chips as well as diluted soluble oil and coolant are prevented from entering behind the suspension element 23 and the profile rail 27. Thus, the entire suspension mechanism of the sliding door 13 is protected from being soiled with matter from the working space 22.

It should be noted in addition that the suspension elements 23 of neighboring slat elements 21 overlap each other alternately in vertical direction to the drawing plane of FIG. 2 so that the profile rail 27 is protected from soiling also in the area between neighboring slat elements 21.

The slat element 21, which is made from plastics and which as such is tight at least on its sides, is mounted on a bottom 35 of the suspension element 23, preferably by a snap-on connection. Between the bottom 35 and the slat element 21, a seal 35' is provided, which prevents coolant from penetrating into the hollow slat element 21 from above. At its lower end, the slat element 21 is connected with a base 36 of a lower guide element 37 by a similar snap-on connection, which is not shown in FIG. 2.

The lower guide element 37 comprises an upwardly open guide channel 38 arranged on the side 39 of the lower guide element 37 that faces away from the working space 22.

The guide channel 38 is in engagement with a lower guide rail 40 whose inner leg 41 is located in the guide channel 38. The lower guide rail 40 comprises a U-shaped profile rail 42 whose outer leg 43 is fastened on the case 11 via a screw 44.

In FIG. 2, the profile rail 42 is open at its bottom so that no dirt can deposit on the inner leg 41. Due to the fact that the guide channel 38 is arranged on that side 39 of the guide element 37 that faces away from the working space 22 and, in addition, below the base 36, no dirt can get into the guide channel 38, either.

Likewise, the design of the lower guide element 37 is such that neighboring guide elements 37 overlap each other so that the risk of the door being jammed by dirt from the working space 22 is excluded also in the area of the lower guide mechanism of the sliding door 13.

Figure 3:
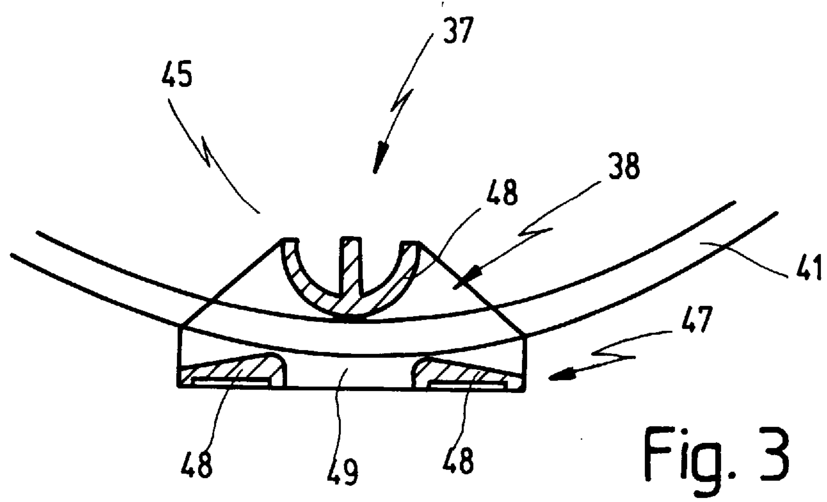
FIG. 3 shows a section through the lower guide element, taken along line III—III in FIG. 2.

FIG. 3 shows a sectional view along line III—III in FIG. 2 through the lower guide element 37 in the area of the guide channel 38. It will be noted that the guide channel 38 comprises a first side wall 45 having the shape of an arc section. In addition, the guide channel 38 has a side wall 47 comprising two lateral wedges 48. Between the two wedges 48, a central area of the second side wall 47 is left open by a recess 49.

The particular arrangement of the two side walls 45 and 47 permits the guide channel 38 to be guided on both a straight and a curved leg 41 with little lateral play so that the sliding door 13 can be wound up or turned aside in the area of the space 20.

This requires that the slat elements 21 be connected one with the other in a hinged fashion. The way this is done will now be described with reference to FIG. 4.

Figure 4:
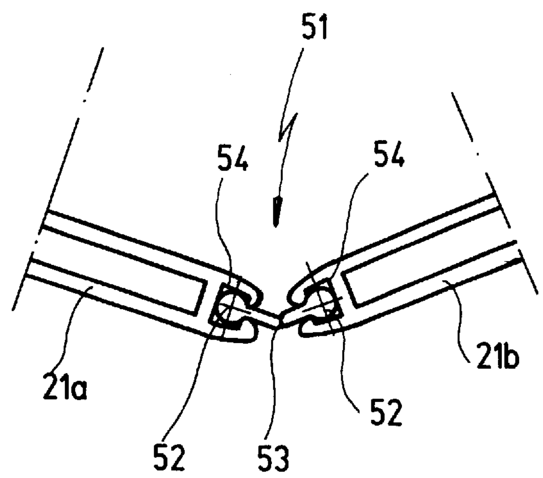
FIG. 4 shows a top view of a detail of two slat elements joined in hinged fashion by a connection element.

FIG. 4 shows two neighboring slat elements 21*a* and 21*b* with a connection element 51 arranged between them. The connection element 51 comprises two outer engaging elements 52 through which it is connected with the slat elements 21*a* and 21*b*. The two engaging elements 52 are connected one with the other via a flexible or articulated web 53. It should also be noted in this connection that the engaging elements 52 are received in channels 54 that are arranged on the ends of the slat elements 21*a* and 21*b* and that comprise a lateral opening through which the 52 projects.

Figure 5:
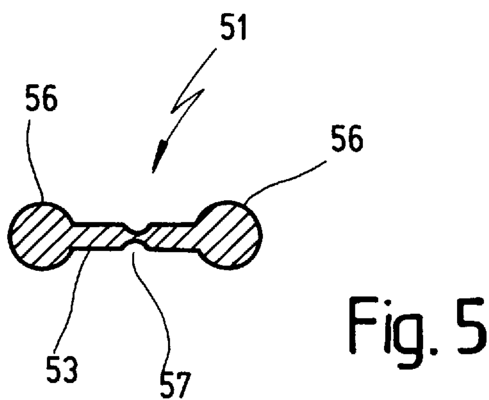
FIG. 5 shows an enlarged representation of the connection element according to FIG. 4.

FIG. 5 shows an enlarged view of the connection element 51. The connection element 51 has the cross-sectional shape of a dumbbell and comprises two outer beads 56 that are received in the channels 54 of the slat elements 21*a* and 21*b*. The web 53 comprises a predetermined buckling point 57, which is implemented by an area of reduced thickness of the material. This predetermined buckling point or area 57 permits the two beads 56 to be buckled one relative to the other by a limited angle, as illustrated in FIG. 4.

The connection element 51 consists of an integrally formed plastic part, which extends over the full height of the slat elements 21 and which thus procures absolutely tight sealing between neighboring slat elements 21*a* and 21*b*.

Figure 6:
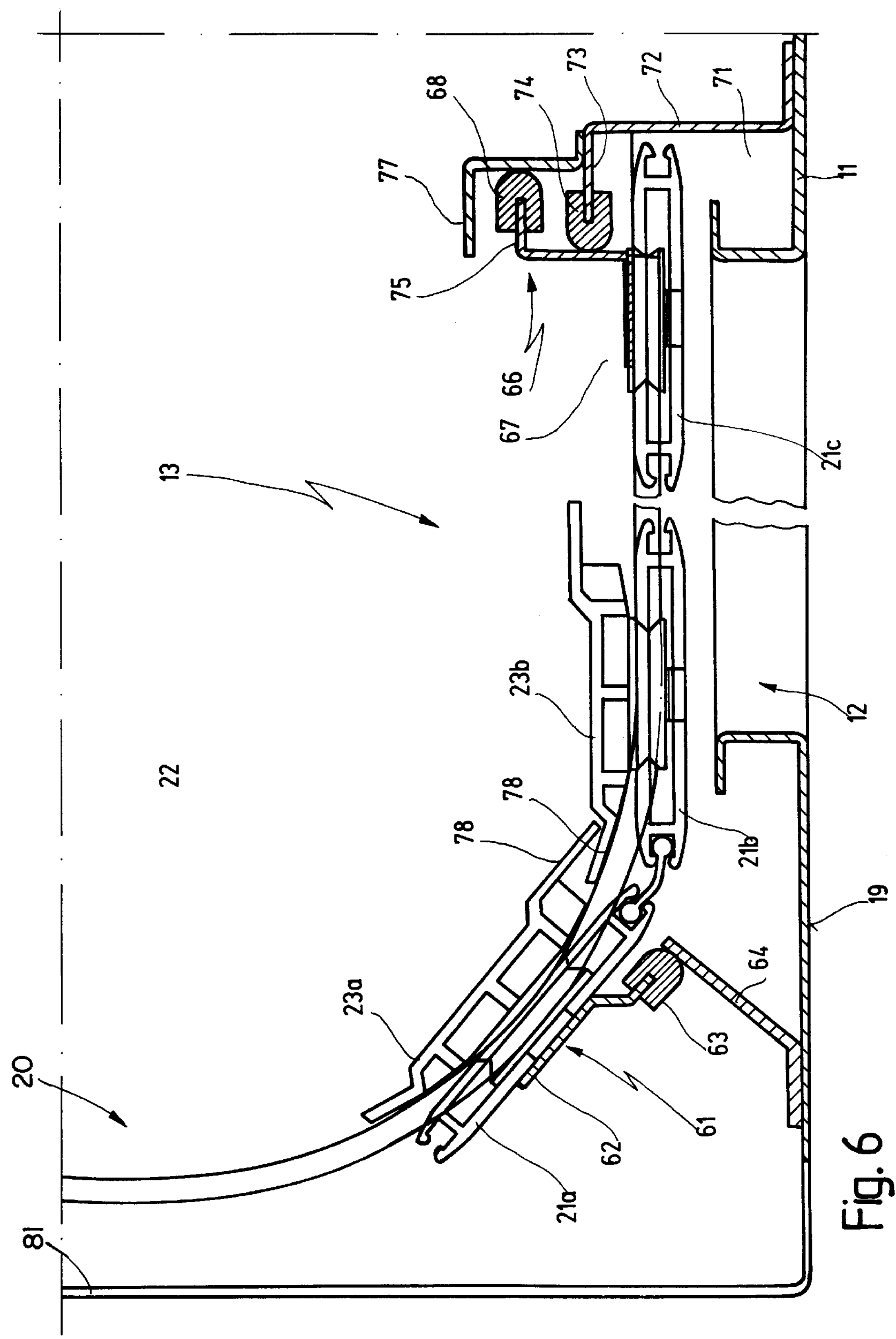
FIG. 6 shows a top view of a horizontal cross-section through the case of the machine tool according to FIG. 1 in the area of the opening, taken along line VI—VI in FIG. 1.

FIG. 6 shows a detail of a horizontal section along line VI—VI in FIG. 1, in the area of the opening 12, where the central area of the opening has been omitted.

FIG. 6 initially shows the curved lower guide rail 40 with the different slat elements 21*a*, 21*b* and 21*c* suspended above it. The upper runner rail 30 and the lower guide element 37 have been omitted in the drawing for reasons of clarity.

The sliding door 13 is shown in closed condition in FIG. 6. It will be noted that the first slat element 21*a* is not used for closing the opening 12, but serves to ensure efficient marginal sealing in the area of the opening 12. To say it in other words, the sliding door 12 is wider than the opening 12 by more than the width of one slat element.

In order to effect such marginal sealing, a stop element 61, comprising a plate 62 with a rubber buffer 63 arranged thereon, is provided on the slat element 21*a*, i.e. on its side facing away from the working space 22. In the closed condition of the sliding door 13 depicted in FIG. 6 the rubber buffer 31 is in engagement with an angled plate 64 fastened on the front face 19. The angled plate 64 and the rubber buffer 63 extend over the full height of the opening 12 and beyond the latter, both on top and at the bottom, so that altogether the left margin of the opening 12 is efficiently sealed from the working space 22.

Mounted on the first slat element 21*c*, in the closing direction of the sliding door 13, is another stop element 66 which comprises sheet-steel angles 67 with a rubber buffer 68 fastened thereon.

The slat element 21*c* projects with its front end into a channel 71 formed by a sheet-steel angle 72. An outer leg 73 of that sheet-steel angle 72 is provided with another rubber buffer 74 which is in engagement with an arm 75 of the sheet-steel angle 67. Another sheet-steel angle 77, which is engaged by the rubber buffer 68, is fastened on the leg 73.

By this arrangement, the stop element closes off the channel 71 from the working space 22 so that a labyrinth-like seal is achieved for the right-hand edge of the sliding door 13, relative to the opening 12. It goes without saying that the rubber buffers 68 and 74, as well as the associated sheet-steel elements 67 and 77, extend again over more than the height of the opening 12 so that again no dirt can escape from the working space 22 to the outside.

Finally, suspension elements 23*a* and 23*b* of the slat elements 21*a* and 21*b* should be noted which—as has been explained above—overlap each other by their extensions 78 so that no dirt can escape from the working space 22 between neighboring suspension elements 23*a* and 23*b* and get onto the upper runner rail 30, which is not shown in FIG. 6. Similarly, the lower guide elements 37 are also arranged to overlap each other.

In FIG. 6 it can be noted that the lower guide rail 40, and correspondingly the upper runner rail 30, not shown in the drawing, take the form of curved guide elements which comprise a portion extending in parallel to the front 19 in the area of the opening 12, followed by curved portions at the left beside the opening 12, which latter terminate by portions extending in parallel to a side wall 81. This arrangement has the effect that when the sliding door is pushed to the left, as viewed in FIG. 6, each successive slat element is turned around by 90° so that in the fully open condition the sliding door 13 then extends almost absolutely parallel to the side wall 81, being accommodated in this condition in the space 20. The space 20 must have a width just sufficient to permit the slat elements 21 to be deflected by 90°. From FIG. 6 it appears that this width corresponds approximately to between once and twice the width of a slat element.

Therefore, what we claim is:

1. A machine tool, having a working space in which workpieces are to be machined, a case for closing off said working space against the outside, said case having an opening to give access to the working space, and a sliding door for closing said opening in said case, the sliding door comprising vertically arranged slat elements that are connected one with the other by hinged connection elements, the sliding door being suspended on an upper runner via rollers, at least some of the slat elements being provided with an upper suspension element with a roller mounted on its side facing away from the working space and a roof section of the suspension element projecting over the roller.

2. The machine tool of claim 1, between every two neighboring slat elements each a connection element is provided, which has substantially the same height as the slat elements and which comprises two outer engaging elements for connection with the two slat elements, as well as a flexible web arranged between the engaging elements.

3. The machine tool of claim 2, wherein the connection element is made as a single piece from a plastic material and is flexible in the area of the web.

4. The machine tool of claim 2, wherein the connection element is made as a single piece from a plastic material and is given a predetermined buckling point in the area of the web.

5. The machine tool of claim 2, wherein the engaging elements are designed as beads and the slat elements are provided with channels receiving the beads, the channels comprising a lateral slot through which the web projects to the outside.

6. The machine tool of claim 1, wherein the sliding door is held on a lower guide rail.

7. The machine tool of claim 6, wherein at least some of the slat elements are provided with a lower guide element with a guide channel provided on its face opposite the working space, for being engaged by the guide rail (40).

8. The machine tool of claim 7, wherein the guide rail comprises a downwardly open profile rail with U-shaped cross-section, the inner leg of which is engaged by the guide channel.

9. The machine tool of claim 8, wherein the guide channel comprises a first arc-shaped side wall, viewed from above, and a second side wall provided with a recess in its central area.

10. The machine tool of claim 1, wherein a cover is provided as a protection above the runner rail.

11. The machine tool of claim 1, wherein the upper runner rail comprises an upwardly open profile rail of U-shaped cross-section, the inner leg of which is engaged by the guiderail.

12. A machine tool of claim 1, wherein the sliding door is wider than the opening by at least the width of one slat element.

13. The machine tool of claim 1, wherein the first and last slat elements are each provided with a stop element which, in the closed condition of the sliding door, is in engagement with a plate that projects from the case.

14. The machine tool of claim 1, wherein in the closed condition of the sliding door the first slat element, in the direction of the closing movement of the sliding door, is seated at least in part in a laterally open channel which extends substantially over the full height of the slat element and is sealed from the working space by an angled sheet fastened on the first slat element.

15. The machine tool of claim 1, wherein the sliding door is arranged with in the working space.

16. The machine tool of claim 1, wherein the sliding door is guided within the working space on curved guide elements, preferably arranged on the case, that extend at least in part along one side wall of the case.

17. The machine tool of claim 1, wherein between the suspension element and the slat element held by it a seal is provided that seals the slat element off against the top.

18. A machine tool, having a working space in which workpieces are to be machined, a case for closing off said working space against the outside, said case having an opening to give access to the working space, and a sliding door for closing said opening in said case, the sliding door comprising vertically arranged slat elements that are connected one with the other by hinged connection elements, the sliding door being held on a lower guide rail, at least some of the slat elements being provided with a lower guide element with a guide channel provided on its face opposite the working space, for being engaged by the guide rail.

19. A machine tool, having a working space in which workpieces are to be machined, a case for closing off said working space against the outside, said case having an opening to give access to the working space, and a sliding door for closing said opening in said case, the sliding door comprising vertically arranged slat elements that are connected one with the other by hinged connection elements, wherein in the closed condition of the sliding door a slat element, being the first in the direction of the closing movement of the sliding door, is seated at least in part in a laterally open channel which extends substantially over the full height of the slat element and is sealed from the working space by an angle sheet fastened on the first slat element.

* * * * *